Aug. 22, 1933.  C. R. HOSLER  1,923,207
VACUUM AUTOMOBILE VENTILATOR
Filed March 30, 1932
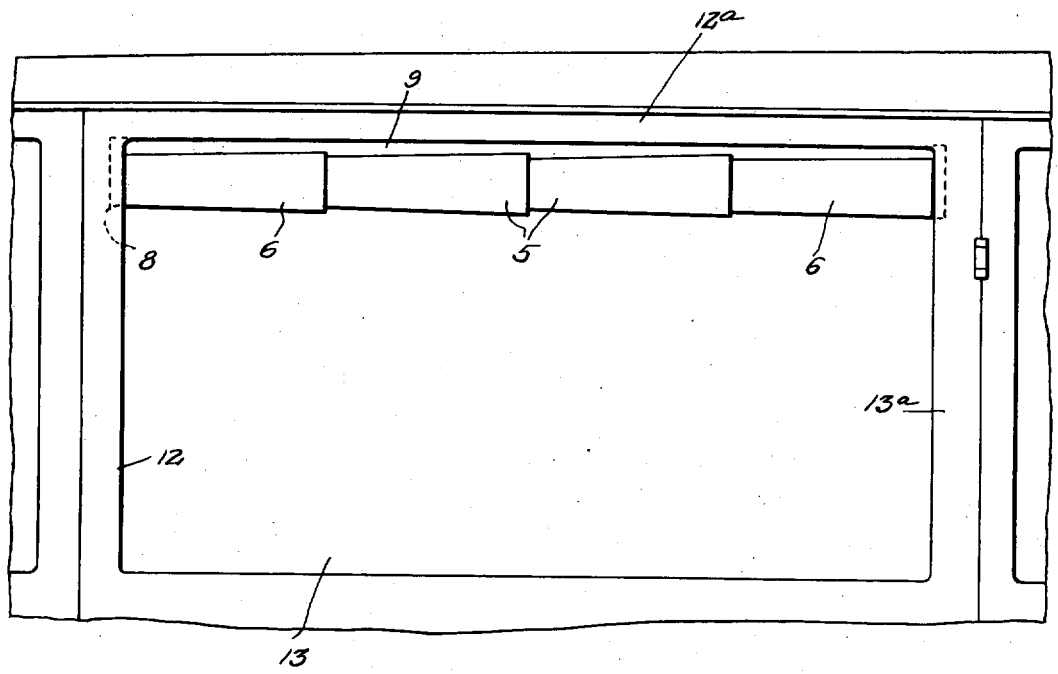
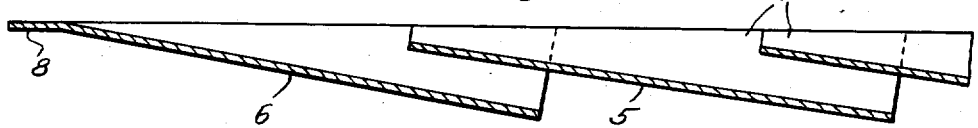
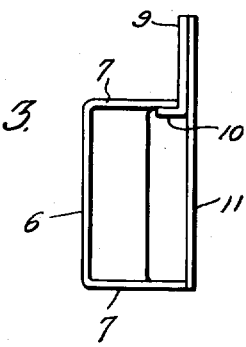
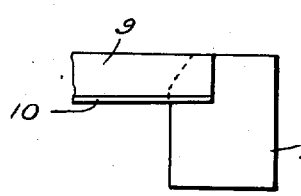
Inventor
Clarence R. Hosler,
By *Clarence A. O'Brien*
Attorney Patented Aug. 22, 1933

1,923,207

UNITED STATES PATENT OFFICE 1,923,207

VACUUM AUTOMOBILE VENTILATOR

Clarence R. Hosler, Findlay, Ohio

Application March 30, 1932. Serial No. 602,042

2 Claims. (Cl. 98—2)

This invention relates to a ventilator for closed cars which is adapted to be placed in a window opening preferably adjacent the upper end of the opening and which will provide for an effective ventilation of the car without objectionable draft.

The invention together with its numerous objects and advantages will be best understood from a study of the following description taken in connection with the accompanying drawing wherein:

Figure 1 is a side elevational view showing a car body window with the ventilator placed therein.

Figure 2 is a longitudinal sectional view taken through a portion of the ventilator.

Figure 3 is an end elevational view thereof.

Figure 4 is a side elevational view of a supporting frame for the ventilator.

Referring to the drawing it will be seen that my improved ventilator comprises a plurality of longitudinally tapering sections including intermediate sections 5 and end sections 6. The sections are substantially identical in construction, being channel shaped in cross section and having the smallest end of one section arranged within the largest end of an adjacent section as shown in Figure 2. The sections 5 and 6 at their proximate ends may be secured together in any suitable manner and present a continuous open side for the completed ventilator. Each of the sections has its top and bottom sides 7 tapering longitudinally as they proceed toward one end, the sides 7 of one end section 6 merging completely into the vertical side of the section and at which end the vertical side of the section is offset from the plane thereof to provide a flange 8. A suspension frame for the ventilator is also provided, and the same comprises a longitudinal member 9 provided at its lower edge with a horizontal flange 10. A substantially rectangular plate 11 is secured at one corner thereof to one end of the strip or frame member 9.

In mounting the ventilator on the vehicle, it will be seen that the open side of the ventilator is presented toward the inside of the car while the flange 8 is inserted in the groove of the vertical window frame member 12. The suspension strip 9 is inserted in the groove of the upper frame member 12a and the flange 10 of said member 9 engages the under sides of the upper side 7 of the sections 5 and 6 as shown in Figure 3. The plate 11 on one end of the member 9 engages in the groove of the other vertical frame member 13a.

It will thus be seen that the ventilator is securely retained in position within the window frame, and the pane 13 may be lowered so that its upper edge will be disposed adjacent the bottom side of the ventilator.

With the ventilator thus positioned in the window opening and with the largest end of the several sections disposed rearwardly, there will be a strong current of air over the rear open end of the section which will create a suction in the several sections to draw air from the interior of the car, the ventilator creating a flow of air from the interior of the car and preventing draft through the window opening into the interior of the automobile.

Even though I have herein shown and described the preferred embodiment of the invention, it is to be understood that I do not limit myself to this precise form herein shown but claim all such forms of the invention to which I am entitled in view of the requirement of the prior art and the scope of the appended claims.

Having thus described my invention, what I claim as new is:

1. A window ventilator comprising a plurality of longitudinally tapering sections each having the smallest end thereof arranged in the largest end of an adjacent section, and all of said sections being open on one side thereof for the full length thereof.

2. The combination with a window of a closed car body having a frame and a vertically sliding window, of a ventilator comprising a plurality of longitudinally tapering sections each having its smallest end arranged in the largest end of a proximate section, all of said sections being opened along one side thereof, and flange means at said open side of the sections engageable with the side and top members of the window frame for securing the ventilator in position.

CLARENCE R. HOSLER.